United States Patent Office.

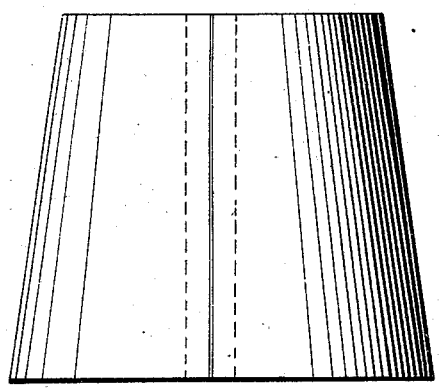
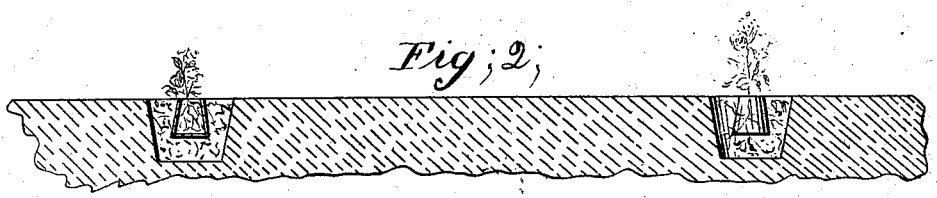

PHILIP POULLAIN, OF GREENSBORO, GEORGIA.

Letters Patent No. 78,233, dated May 26, 1868.

---

IMPROVEMENT IN THE CULTIVATION OF THE COTTON AND OTHER PLANTS.

---

The Schedule referred to in these Letters Patent and making part of the same.

---

TO ALL WHOM IT MAY CONCERN:

Be it known that I, PHILIP POULLAIN, of Greensboro, in the county of Greene, and State of Georgia, have invented a new and useful Improvement in Germinating and Transplanting Cups, and the Cultivation of Cotton, &c.; and I do hereby declare that the following is a full, clear, and exact description thereof, which will enable others skilled in the art to make and use the same, reference being had to the accompanying drawings in illustration thereof, and forming a part of this specification, in which—

Figure 1 represents a side elevation of one mode of constructing my improved germinating and transplanting cup.

Figure 2 represents the cup as applied in transplanting.

Similar letters of reference indicate corresponding parts.

The nature of this invention consists in the application and use of a cup or pot, having taper sides, and open at both ends, for the purpose of germinating and raising cotton and other plants from the seed, and transplanting the young plants in the open ground, without injuring the roots, by drawing the taper-sided cup from the earth over the young plants when they are set out.

This cup or pot may be made of any suitable material, in the form of the frustum of a cone, or a pyramid, having taper sides, and both its ends open.

For the cultivation of cotton, this improved germinating and transplanting cup is especially advantageous. It is well known that the cotton-plant is an exotic in the southern States of this country, and that the frosts in the spring and fall limit the season of growth, and prevent its arriving at full maturity, thereby rendering the crop precarious, and curtailing production. No attempt to advance the growth of the plant, and prolong the growing-season, by setting out young plants, has hitherto succeeded, on account of the extreme delicacy and fragility of their roots, which are broken and injured by the least disturbance of the earth in which the plants are growing. The practicability of transplanting cotton-plants in the field successfully is, therefore, generally disbelieved and doubted by planters; but, with my improved germinating and transplanting cup, I am enabled to set them out in the field without injury to the roots, so that they grow without interruption.

Beds are prepared in favorable locations, in which the cups are placed, filled with earth, to receive one or more seeds in each cup, and the young plants, after germinating, are protected from frost and inclement weather by covering them with cotton-bagging, or in any suitable manner.

The cups may be set upon a board, to be transported on it to the field for transplanting the plants, or, when set directly upon the earth, they may be lifted gently with a thin blade, introduced under them, and placed upon a barrow or other carriage for transportation, without disturbance of the roots, which is the essential object of my invention.

The plants thus raised are set out in the field, after all danger of frost has passed, and, being in an advanced stage of growth, the season for blossoming and maturing the fruit or pods is prolonged, and the production is much increased.

The drawing represents my improved germinating and transplanting cup when made in the form of the frustum of a cone, and in fig. 2 is seen a plant growing in the cup ready for setting out in the field.

For this purpose I prepare the ground by digging or trenching it about two feet deep, and throwing out the subsoil, which is replaced with the top soil or mould. The plants are set out in wide rows, about eight feet apart, to allow room for a large growth. When the plants are set out, the cups are placed in a hole adapted to them, with the top nearly or quite level with the surface of the ground. The sides are then gently tapped, to loosen the cup from the earth, when it is gently drawn upward over the plant, which is left standing in its place, without the slightest injury to the root.

The method heretofore employed for removing plants out of their pots with balls of earth, for transplanting, has been to turn the pot upside down, and by striking the edge against some hard substance to so jar the contents as to loosen the same, and break off the adhesion of the earth to the walls of the pot. Another method of removal is to draw the plant and earth together by the stem. If these efforts fail, a thin blade is commonly thrust down between the earth and the interior of the pot to loosen the earth, and aid in its withdrawal.

Frequently, however, the bellied or irregular form of the pot prevents the possibility of removing the ball of earth entire, in which case the pot must be destroyed.

But all these methods of removing plants prior to transplanting, and all means heretofore employed for this purpose, are found to be injurious to the young plant, by a disturbance and rupture of the roots, thereby seriously impairing its vitality, and checking its growth, even if it do not actually kill it, as in the case of cotton, melons, and other extremely tender plants, which cannot be successfully transplanted by any of the methods heretofore employed.

By means, however, of my improved pot, with taper sides and open ends, to be drawn up over the plant when placed in the earth, the ball of earth is not only preserved entire and undisturbed, with the roots of the plant uninjured, but the pot itself is saved for its future use.

Now, my invention is strictly limited and confined to pots having taper sides and open ends, which are employed and operated in the manner just described, whereby the young plants raised therein from the seed may be planted in the open ground, without injury to the roots, by drawing the pot from the earth over the plants; and I do hereby expressly disclaim all the well-known devices and methods employed by gardeners and florists with flower-pots and transferring-tools for raising and transplanting young plants, in order to advance their growth and prolong the season for maturing them, which are the object and result of my invention.

I do not claim simply the frustum of a cone, used as a germinating and transplanting cup or pot, as that is already in common use as an ordinary flower-pot, nor do I claim the employment of the frustum of a cone for any other purpose than as herein described; but, having thus described my invention, and the mode of carrying out its practical application,

What I claim, and desire to secure by Letters Patent, is—

1. The improved cup, having taper sides, and both ends open, when adapted and employed for germinating and transplanting cotton, and other small and tender plants, in the manner and for the purpose herein described.

2. The improved method herein described for transplanting cotton and other plants, by means of the device, in the manner and for the purpose herein set forth.

The above specification of my invention signed by me, this 22d day of October, 1867.

PHILIP POULLAIN.

Witnesses:
WM. F. McNAMARA,
J. ALISON FRASER.